US011593003B2

(12) United States Patent
Shilane et al.

(10) Patent No.: US 11,593,003 B2
(45) Date of Patent: Feb. 28, 2023

(54) METHOD AND SYSTEMS FOR RECOMMENDING STORAGE MANAGEMENT ACTIONS BASED ON CAPACITIES OF STORAGE SYSTEMS

(71) Applicant: EMC IP Holding Company LLC, Hopkinton, MA (US)

(72) Inventors: Philip Shilane, Newtown, PA (US); Kimberly Lu, Sunnyvale, CA (US); Tipper Truong, San Jose, CA (US); Abhinav Duggal, Jersey City, NJ (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/195,262

(22) Filed: Mar. 8, 2021

(65) Prior Publication Data
US 2022/0283716 A1 Sep. 8, 2022

(51) Int. Cl.
*G06F 12/00* (2006.01)
*G06F 3/06* (2006.01)

(52) U.S. Cl.
CPC .......... *G06F 3/0631* (2013.01); *G06F 3/0604* (2013.01); *G06F 3/067* (2013.01); *G06F 3/0619* (2013.01); *G06F 3/0644* (2013.01); *G06F 3/0647* (2013.01)

(58) Field of Classification Search
CPC .... G06F 3/0631; G06F 3/0604; G06F 3/0619; G06F 3/0644; G06F 3/0647; G06F 3/067
See application file for complete search history.

(56) References Cited

U.S. PATENT DOCUMENTS

| | | | | |
|---|---|---|---|---|
| 10,146,450 | B1 * | 12/2018 | Lin | G06F 11/14 |
| 10,509,667 | B1 * | 12/2019 | Popuri | G06F 9/45558 |
| 10,564,998 | B1 * | 2/2020 | Gritter | G06F 9/5083 |
| 2009/0006799 | A1 * | 1/2009 | Korupolu | G06F 3/067 |
| | | | | 711/170 |
| 2010/0115223 | A1 * | 5/2010 | Sakaguchi | G06F 21/602 |
| | | | | 711/170 |
| 2015/0363117 | A1 * | 12/2015 | Manpathak | G06F 3/0611 |
| | | | | 711/170 |
| 2019/0385045 | A1 * | 12/2019 | Poovalapil | G06F 3/0629 |
| 2020/0027014 | A1 * | 1/2020 | Wen | G06N 5/02 |
| 2021/0165677 | A1 * | 6/2021 | Gritter | G06F 9/45558 |
| 2022/0036224 | A1 * | 2/2022 | Sethi | G06F 8/71 |

* cited by examiner

*Primary Examiner* — John A Lane
(74) *Attorney, Agent, or Firm* — Womble Bond Dickinson (US) LLP (57) ABSTRACT

Disclosed is a system for storage management comprising: receiving capacity information within a predetermined time period from a plurality of storage in a first appliance pool and a second appliance pool, each having a plurality of storage systems; tracking a first capacity limit of the first storage system in the first appliance pool based on the capacity information; performing a first capacity prediction of the first storage system based on the tacked result of the first storage system, wherein the first capacity prediction indicating when the first storage system will be out of space based on the capacity information and the tracked result; generating a first recommendation indicating when an extra capacity of the first storage system should be added based on one or more attributes including the first capacity prediction; and presenting the first recommendation with one or more options.

20 Claims, 8 Drawing Sheets

METHOD AND SYSTEMS FOR RECOMMENDING STORAGE MANAGEMENT ACTIONS BASED ON CAPACITIES OF STORAGE SYSTEMS

FIELD OF THE INVENTION

Embodiments of the present application relate generally to data storage systems. More particularly, embodiments of the application relate to recommending storage management actions based on capacities of storage systems.

BACKGROUND

Customers regularly struggle with storage management issues, often due to data storage being unevenly distributed in systems, some being overwhelmed while their counterparts being greatly underused. Currently, Data Domain (DD) customers have a multitude of different data storage (e.g., Data Domain, DD) systems within either one site alone, or across multiple sites This is critical since data performance varies across systems due to differing backup and restore demands. When a customer tries to solve this issue by manually rebalancing their many clients/folders/M-trees, which are selected directories they allocate for the purpose of being managed across data storage systems, it is often difficult. This is because customers are left to openly guess how much space will be freed by migrating a client/folder/M-tree of data to another destination. We have designed a Recommendation Service that is being developed to provide recommendations about these management issues. The Recommendation Service is a containerized micro-service that interacts with other services and modules to retrieve information about the data storage systems being managed, and provides recommendations based on this data to clients. This disclosure focuses on the Recommendation Service, and includes text taken from the architecture specification.

BRIEF DESCRIPTION OF THE DRAWINGS

Embodiments of the disclosure are illustrated by way of example and not limitation in the Figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
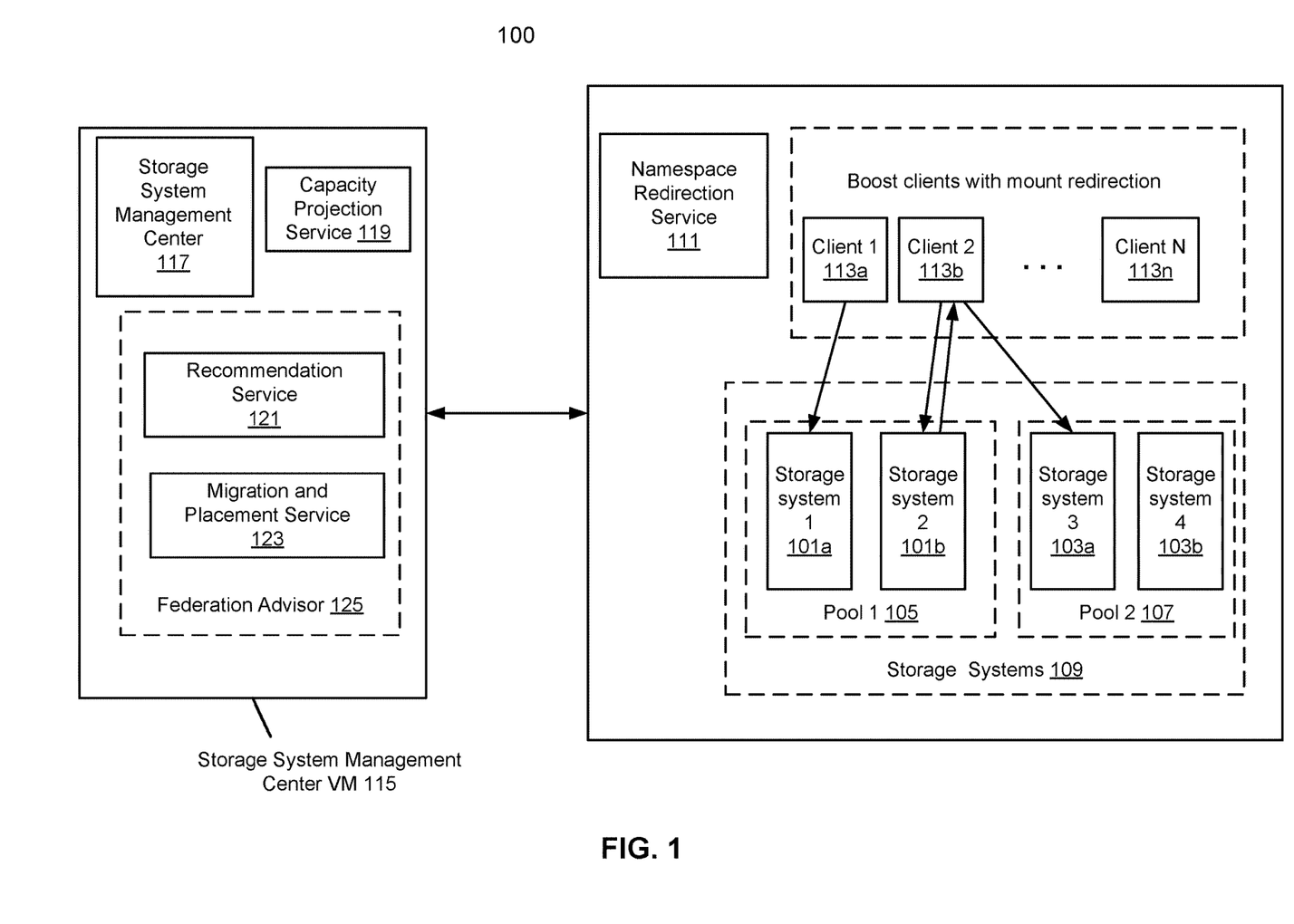
FIG. 1 is a block diagram illustrating a storage management system, according to an embodiment of the application.

Embodiments of the disclosure are related to an apparatus, method, and system for recommending storage management actions based on capacities of storage systems. For example, this disclosure covers the early design and implementation plan for the Recommendation Service that will be used on a large scale. While numerous recommendations are possible for a group of federated (i.e. mostly independent) storage systems, this disclosure focus on four specific recommendations. In FIG. 1, according to an embodiment, those recommendations either apply to individual storage (e.g., Data Domain, DD) systems (101a, 101b, 103a, 103b) or an appliance pool (105, 107), which consists of federated storage systems 109 to boost clients (113a, 113b . . . 113n) with mount redirection. In an embodiment, the storage system can be connected with the namespace redirection service virtual machine (VM) that participate in a unified namespace through the namespace redirection service module 111. Referring to FIG. 1, which shows storage systems (e.g., Data Domain systems) 101a, 101b, 103a, 103b grouped by appliance or storage pools (105, 107). For example, the appliance/storage pool 1 (105) includes storage system 1 (101a) and storage 2 (101b) and the appliance/storage pool 2 (107) includes storage 3 (103a) and storage 4 (103b). For each appliance pool (e.g., 105, 107), we currently support M-tree-level migration between storage systems (e.g., 101a, 101b) in an appliance pool (e.g., 105) and will eventually support client-level (folder) migration. In an embodiment, the storage system management center virtual machine (VM) 115 provides of the recommendations via storage system management center module 117. For example, the storage system management center VM 115 includes capacity projection service module 119 to provide capacity projection services. In an embodiment, the storage system management center VM 115 includes federation advisor 125. In an embodiment, federation advisor 125 includes Recommendation Service module 121 to provide recommendation services. In an embodiment, federation advisor 125 includes Migration and Placement Service module 123 to provide Migration and Placement Services.

In an embodiment, the recommendation service system provides the following recommendation services. For example, Recommendation Service 121 provides recommendations about adding capacity to a storage system (101a, 101b, 103a, 103b) before it runs out of space. For example, as a storage system fills up, it approaches its capacity limit. In an embodiment, if additional capacity can be added (e.g., the system is below its maximum capacity), a recommendation to add more capacity will be given. However, if a system's capacity cannot be further expanded because it is at maximum already, then the system would recommend an addition of a new storage system to the appliance pool so the pool has additional space for customer storage. In an embodiment, customers protect data in backups, which are written to an M-tree that stored in the storage system. For example, for M-tree placement recommendation, the customer can specify an appliance pool (e.g., 105) and the Recommendation Service 121 will provide a list of storage systems (e.g., 101a, 101b) within that pool (e.g., 105) for M-tree placement. In an embodiment, this storage system recommendation can be based on various factors such as the available and projected capacity of the storage system, how much deduplication can be achieved, etc., when an M-tree is newly created. In an embodiment, as a storage system (e.g., 101a) becomes full, there may be additional capacity available on one or more storage systems (e.g., 101b) in the appliance pool (e.g., 105). To avoid an out-of-space situation on the first storage system (e.g., 101a), recommendations suggest alternative storage systems within the same appliance pool where an existing M-tree (or client or folder) can be migrated according to an embodiment.

The diagram in FIG. 1 shows a high-level architecture of an early deployment of the Recommendation Service within the larger architecture according to an embodiment. For example, in FIG. 1, on the right are shown Storage Boost clients (113a, 113b . . . 113n) writing to and reading from storage systems (101a, 101b, 103a, 103b). In an embodiment, the Namespace Redirection Service 111 and database interacts with Storage Boost clients to update them about the location of M-trees (and eventually clients and folders) since data may be migrated. In an embodiment, in FIG. 1, on the left is the storage system management center (e.g., Data Domain Management Center, DDMC) VM 115 including its database of historical data about the storage systems managed by storage system management center 117. In an embodiment, besides the storage system management center 117 set of functionalities, the storage system management center VM 115 adds a Capacity Projection Service 119, Recommendation Service 121, and Migration and Placement Service 123.

In an embodiment, all three of services 119, 121, 123 in the storage system management center VM are being implemented as Docker containers, and their location may change in future deployments. In an embodiment, if the Recommendation Service becomes resource-intensive in the future, Capacity Projection Service 119, Recommendation Service 121, and Migration and Placement Service 123 may need to be moved to a separate VM to avoid impacting the performance of the storage system management center. In an embodiment, this design also can be deployed to a container orchestration environment in the future.

Figure 2:
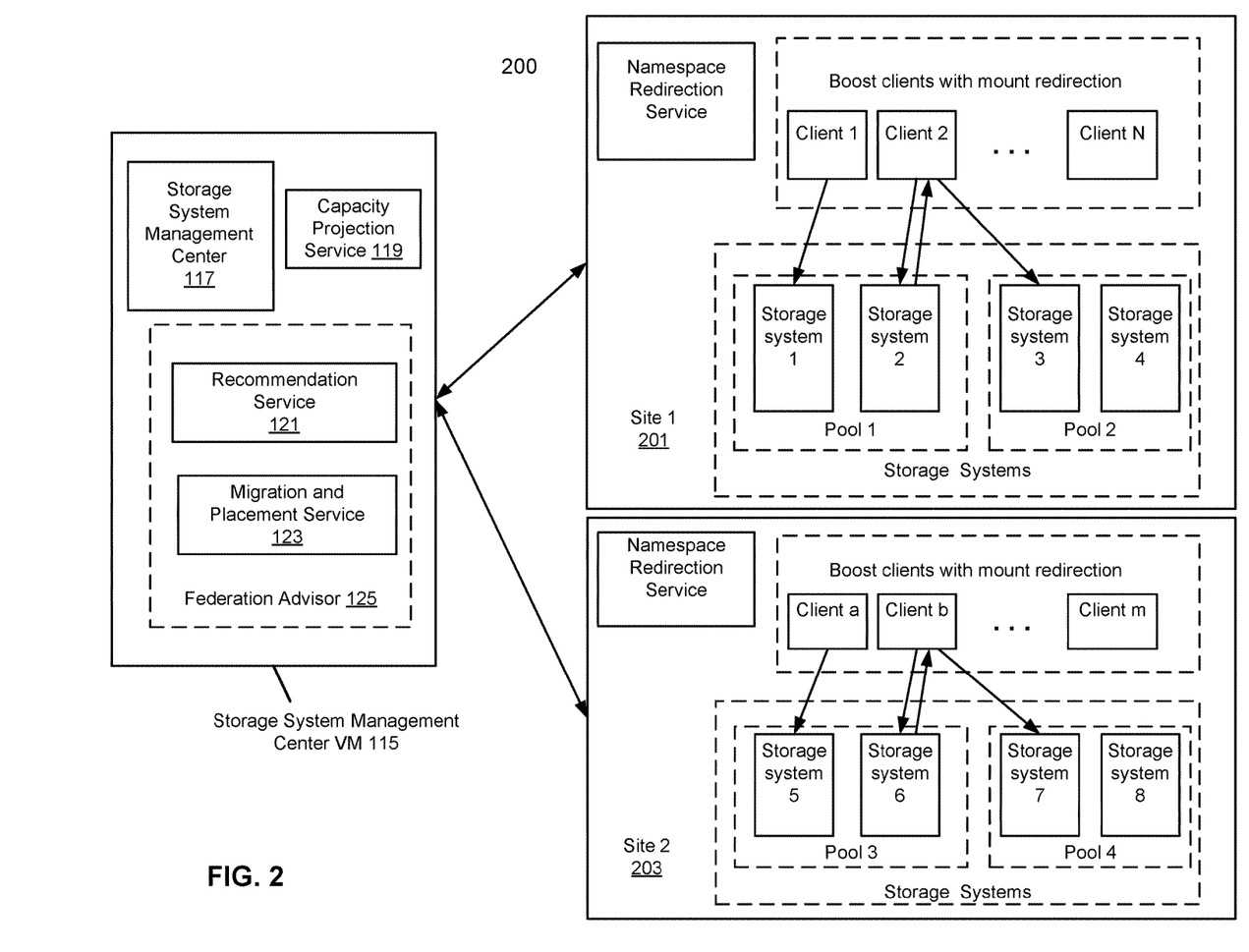
FIG. 2 is a block diagram illustrating a storage management system with different sites, according to an embodiment of the application.

The diagram in FIG. 2 shows the storage system management center 117 managing multiple sites 201, 203 according to an embodiment. For example, the Recommendation Service may only need a single instance as long as there are sufficient resources (CPU and RAM) on the storage system management center VM 115. In an embodiment, as an extension, there can be multiple Recommendation Services, each creating recommendations for a subset of the storage systems (storage systems 1-8) and appliance pools (Pools 1-4). In an embodiment, there can also be multiple Capacity Projection Services 119 to create projections in parallel and provide capacity information to the Recommendation Service(s) 121. In an orchestration environment, such as Kubernetes, the number of instances of these services can scale up and down based on demand, but can also be manually scaled according to an embodiment.

In an embodiment, all recommendations are designed to be consumed by both the storage system management center and customers directly through Representational State Transfer (REST) application program interfaces (APIs). In an embodiment, the storage system management center will display recommendations through a graphical user interface (GUI) to customers. In an embodiment, customers also have the option to query the Recommendation Service directly. In an embodiment, the order of recommendations returned will be determined by a combination of importance of the recommendation and customer-specified preferences. For example, without a customer preference, the storage system management center would order adding capacity to a storage system over adding a storage system to an appliance pool because of the cost differences. In an embodiment, recommending a M-tree migration to avoid overloading a storage system should be preferred over adding capacity to a storage system, since that is a direct cost to a customer. In an embodiment, as mentioned above, the recommendations are not independent of each other, and recommendations should be ordered before they are returned.

In an embodiment, the Recommendation Service in a first implementation consists of a fairly simple logic structure with conditional statements. For example, the service will query the storage system management center and Capacity Projection Service for the data it needs to make recommendations, perform calculations on the data, filter results based on properties of systems and the appliance pool, and respond. In an embodiment, over time, though, the storage system management center is expected to add more complicated recommendations, potentially some of which may be calculated offline. In an embodiment, as the functionality expands over time, changing the internal structure of the Recommendation Service to be extendable and configurable is foreseeable. Further, in an embodiment, besides using capacity information, the storage system management center may likely use information about backup performance, storage system resource utilization, and deduplication of content sent to a storage system. In an embodiment, while the recommendations themselves will likely remain in code, they may be turned on/off and configured based on environment variables or policies specified by the customer.

In an embodiment, the format of the returned recommendations will likely be in a numeric form to support internationalization. For example, recommendations may include sufficient detail that a human can understand the reason for the recommendation. In an embodiment, recommendations may also be included in other logs for future analysis and improvements.

In an embodiment, four possible recommendations generated by the storage system management center are described below.

(1) Recommend adding capacity before a storage system with less than current capacity supported (e.g., 101a) is within a specified number of days of reaching a capacity threshold:

In an embodiment, for customers with numerous storage systems (e.g., storage systems 1-4), tracking system capacity is important in order to avoid out of capacity situations that would cause backup failures. In an embodiment, to avoid backup failures, the Recommendation Service will analyze storage capacity and predict the future used capacity based on a variety of parameters. In an embodiment, when the predicted capacity is expected to reach the current capacity supported, a recommendation will be made to add more capacity, if that is possible. In an embodiment, the capacity projection algorithm currently can be a variant of linear regression. In another embodiment, a different prediction algorithm may be used.

Figure 3:
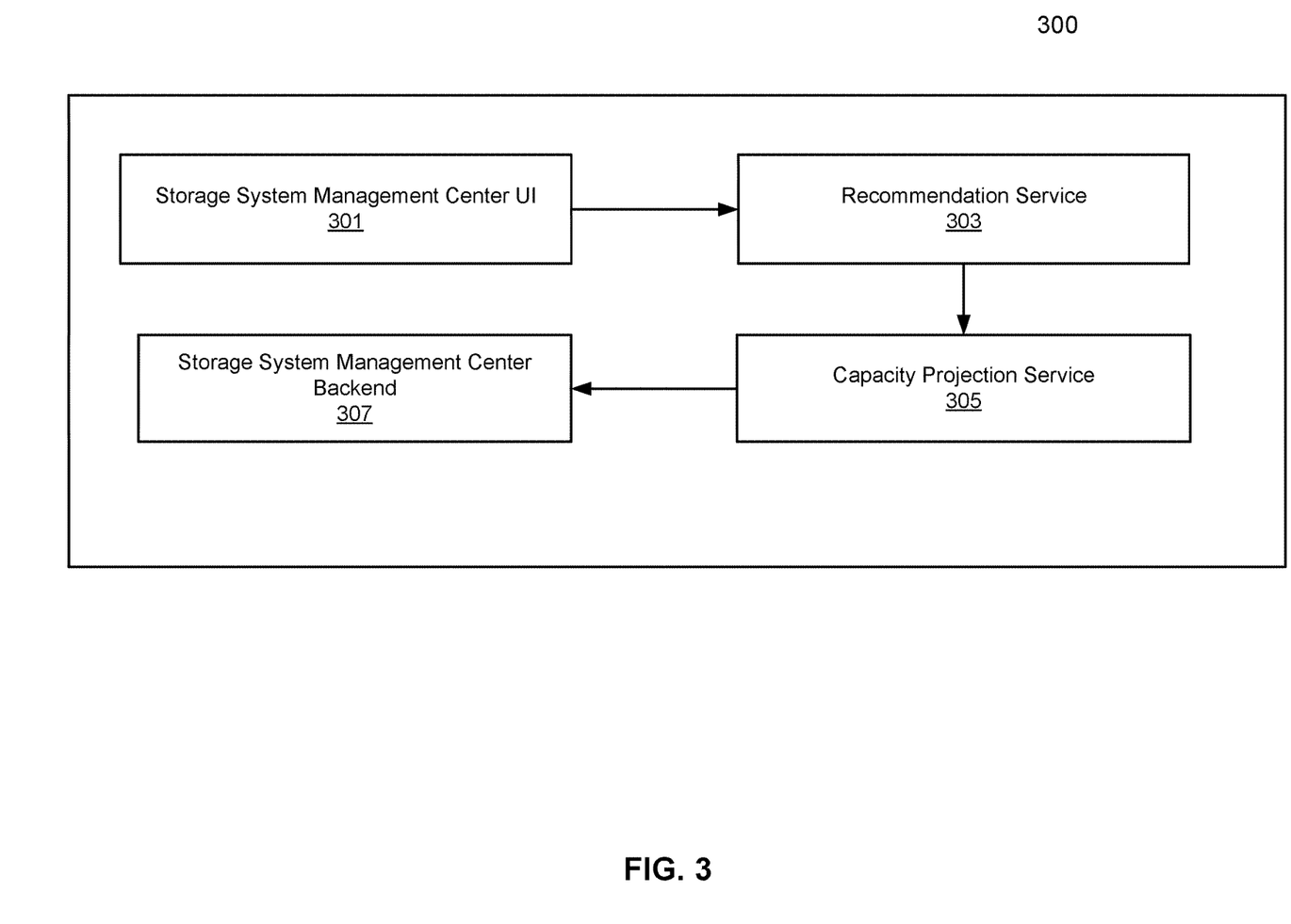
FIG. 3 is a block diagram illustrating a process of a storage management system, according to an embodiment of the application

In an embodiment, the diagram in FIG. 3 shows when recommendations are requested, the Recommendation Service 303 will communicate with the Capacity Projection Service 305 to receive the predicted capacity for each storage system (whether in an appliance pool or not) in a given timeframe. In an embodiment, if the predicted capacity is greater than or equal to the current supported capacity for the storage system, more capacity is needed to avoid backup failures. The Capacity Projection Service 303 will in turn communicate with the storage system management center backend 307 for historical capacity information that is stored in a database.

Next, the Recommendation Service 303 will compare the capacity of the storage system against the maximum capacity supported by the model as recorded in the Recommendation Service's internal catalog, according to an embodiment. For example, a recommendation may suggest adding sufficient capacity to avoid the system reaching its threshold within a specified time period (likely many months) based on projections provided by the Capacity Projection Service 305. In an embodiment, if more capacity can be added, then this recommendation will be returned to the storage system management center or the client. In an embodiment, the maximum capacity supported will vary by the storage system model. In an embodiment, recommendations may be sorted by priority such as systems that are predicted to be at a full capacity sooner may appear earlier in a list of recommendations.

In an embodiment, all of these operations are lightweight and can be handled in a synchronous call from the storage system management center 307. For example, initial experiments indicate that calculating predicted capacity per system takes—3 microseconds, so calculations for hundreds of systems can likely be completed in under a millisecond. In an embodiment, capacity projections are generated when a customer visits the storage system management center UI page 301 with capacity projections, so this is an infrequent operation. In an embodiment, recommendations may run hourly and also need capacity projections. In an embodiment, if performance experiments indicate that the latency is too high, the storage system management center will switch to a model where the Recommendation Service 303 periodically calculates and stores recommendations asynchronously.

(2) Recommend adding a new storage system to an appliance pool (e.g., 105) a specified number of days before the pool has reached a capacity threshold:

In an embodiment, similar to the previous customer use case, an appliance pool (e.g., 105) may reach its full capacity, meaning all storage systems (e.g., 101a, 101b) within an appliance pool (e.g., 105) are configured for their maximum capacity, and backups will begin to fail. In an embodiment, the Recommendation Service 121 in this situation will recommend adding another storage system to the appliance pool (e.g., 105) for future M-tree/client/folder assignments or possibly migrations.

In an embodiment, the communication flow is also similar to the previous customer use case shown the diagram in FIG. 1. For example, when queried, the Recommendation Service 121 will communicate with the Capacity Projection Service 119 to receive the predicted capacity for an appliance pool (105, 107) in a given timeframe. In an embodiment, if the predicted capacity is greater than or equal to the maximum capacity for the appliance pool (e.g., 105), another storage system is needed to avoid backup failures. It should be noted, since the definition of an appliance pool can be changed over time (i.e., storage systems can be added or removed), the capacity projections should be based on the current definition of an appliance pool instead of its historical state. Therefore, the historical capacity for the storage systems in the appliance pool will be queried and used for a projection for the appliance pool.

Generally speaking, adding a storage system is a large step for a customer. Therefore, the priority is to recommend adding capacity to individual storage systems when that is possible. This preference can be configurable for instances where a customer may have a spare storage system and prefer to expand the appliance pool over other recommendations. In an embodiment, when all of the storage systems (e.g., 101a, 101b) within a pool (e.g., 105) have reached their maximum capacity supported by their models, then adding a new storage system to the appliance pool (e.g., 105) is recommended. Alternatively, if there is a storage system with available capacity at the site that is not assigned to an appliance pool, we can recommend adding that storage system to the appliance pool.

As discussed before, these calculations are lightweight and can be handled synchronously, though other styles may be necessary.

(3) Recommend where to place a M-tree/client/folder within an appliance pool (e.g., 105, 107) to meet customer service level agreements (SLAs) such that it will not need to be migrated for as long as possible:

For new primary data that needs to be protected, assigning its backups to a storage system (101a, 101b, 103a, 103b) can be a challenging management task for customers who need to balance many conflicting requirements. In an embodiment, the Recommendation Service 121 will simplify this process by recommending one or more storage systems (101a, 101b, 103a, 103b) within a pool (105, 107) as the initial placement of a new M-tree/client/folder.

In an embodiment, there are multiple requirements the Recommendation Service 121 will consider, starting with any properties specified for the M-tree/client/folder such as: 1) Estimated capacity needed. 2) Backup schedule. 3) Storage system properties needed such as replication, encryption, retention lock, etc.

In an embodiment, if the customer specified system properties, they must be respected when recommending a storage system for M-tree placement. In an embodiment, the Recommendation Service 121 will first filter the storage systems (e.g., 101a, 101b) within the appliance pool (e.g., 105) to those systems that have the specified properties.

Next, in an embodiment, capacity requirements will be checked: 1) If a hint about an M-tree's expected size is provided, storage systems without sufficient capacity for the backups will be filtered out. In an embodiment, if a hinted size is not provided, the Recommendation Service 121 would filter storage systems based on the SLAs and return a sorted list of storage systems based on their capacity projections (date furthest away from full capacity is the top recommendation). 2) The Capacity Projection Service 119 will be queried for the eligible storage systems to determine when they are expected to become full. 3) Then the storage systems with the largest time until they become full will be preferred.

In an embodiment, as a further extension, the Recommendation Service 121 may also consider performance, scheduling issues, and potential content overlap.

In an embodiment, the Recommendation Service 121 will return a list of potential storage systems (101a, 101b, 103a, 103b) for initial placement to the storage system management center 117, ordered by the properties considered. In an embodiment, besides ordering the recommended storage systems, enough information will be provided that a person can understand the basis for the recommendations including whether system properties are supported and available future capacity.

(4) Recommend where to migrate a M-tree/client/folder within an appliance pool to avoid overloading system capacity and to remove performance hot-spots for CPU, disk I/O, and streams, etc.:

In an embodiment, for customers using federated storage systems, an appliance pool (105, 107) can be viewed as a large pool of storage where their backups reside. In an embodiment, while administrators will likely continue to think about individual storage systems (101a, 101b, 103a, 103b), their backup and restore operations should be agnostic about which storage system holds the physical data within an appliance pool (105, 107).

In an embodiment, to support this level of abstraction for customers, it is important to balance resource utilization within an appliance pool (105, 107) reasonably well. For example, if a storage system (e.g., 101a) reaches its maximum capacity, while there is capacity available on other storage systems (e.g., 101b), backups to that storage system will fail that could be handled by the appliance pool (e.g., 105). For another example, writes/reads to/from an appliance pool (105, 107) should have consistent performance, so the appliance pool (105, 107) should avoid hot spot situations where a single storage system (e.g., 101a) becomes the bottleneck when accesses could be spread across an appliance pool (e.g., 105). In an embodiment, while we can try to balance expected usage during the initial placement recommendation, we do not have sufficient information about the future access patterns of a M-tree/client/folder to fully balance resource usage.

In an embodiment, to support this level of balanced usage, it may become necessary to migrate a M-tree/client/folder from one storage system (e.g., 101a) to another (e.g., 101b) within an appliance pool (e.g., 105). In an embodiment, the Recommendation Service 121 will provide recommendations about which M-trees/clients/folder to migrate and where they should be placed within an appliance pool (e.g., 105). In an embodiment, properties to incorporate into the decision include: 1) Capacity used by the M-tree/client/folder and storage systems (e.g., 101a, 101b) within the appliance pool (e.g., 105). 2) The storage system properties such as retention lock, encryption, etc. specified by the M-tree. 3) Amount of times an M-tree/client/folder on storage systems (e.g., 101a, 101b) within the appliance pool (e.g., 105) is opened, read, or written as a stream in use. 4) Network bandwidth requirements. 5) Timing of backups and resource availability at that time. 6) Content overlap between the M-tree/client/folder on the current storage system and target storage system.

In an embodiment, in an initial deployment, the storage system management center will focus on the capacity used by an M-tree/client/folder and available capacity on other storage systems, and the storage system management center can be expected to incorporate more properties.

There are multiple factors the storage system management center will consider when making a migration recommendation: 1) In an embodiment, migrating a M-tree is likely an expensive operation due to its size, and the main use of migration may be when an appliance pool expands. For example, migrations require read streams on the source storage system, network bandwidth, and write streams on the target storage system, besides ongoing backups and restores that should not be impacted. 2) In an embodiment, the storage system management center is able to support the migration of clients/folder instead of only M-trees. It should be noted these are smaller granularities within a M-tree and will require fewer resources for migration. 3) In an embodiment, moving a M-tree/client/folder should reduce the capacity usage on the source. It should be noted if its content overlaps with other items on the source storage system, migration may not free up enough capacity to make migration worthwhile even if stream counts are better balanced by migration. For example, when the system performs deduplication on data, the repeated content can be replaced with a reference to the first occurrence, which leads to lower space usage when files, such as backups of the same system, partially overlap. In an embodiment, additional information about content overlap can be incorporated into the decision. 4) In an embodiment, migrations do not incur additional costs to a customer, unlike adding capacity or a storage system, so recommending a migration should likely take precedence over other recommendations. 5) In an embodiment, when a migration begins, recommendations should be aware of the amount of space that may be taken on the destination storage system and avoid other recommended migrations that could overly fill the destination storage system.

In an embodiment, the storage system management center may provide "what-if" level advice about what will happen to capacity and resource usage on the source and target systems after initial M-tree placements and later migrations.

Figure 4:
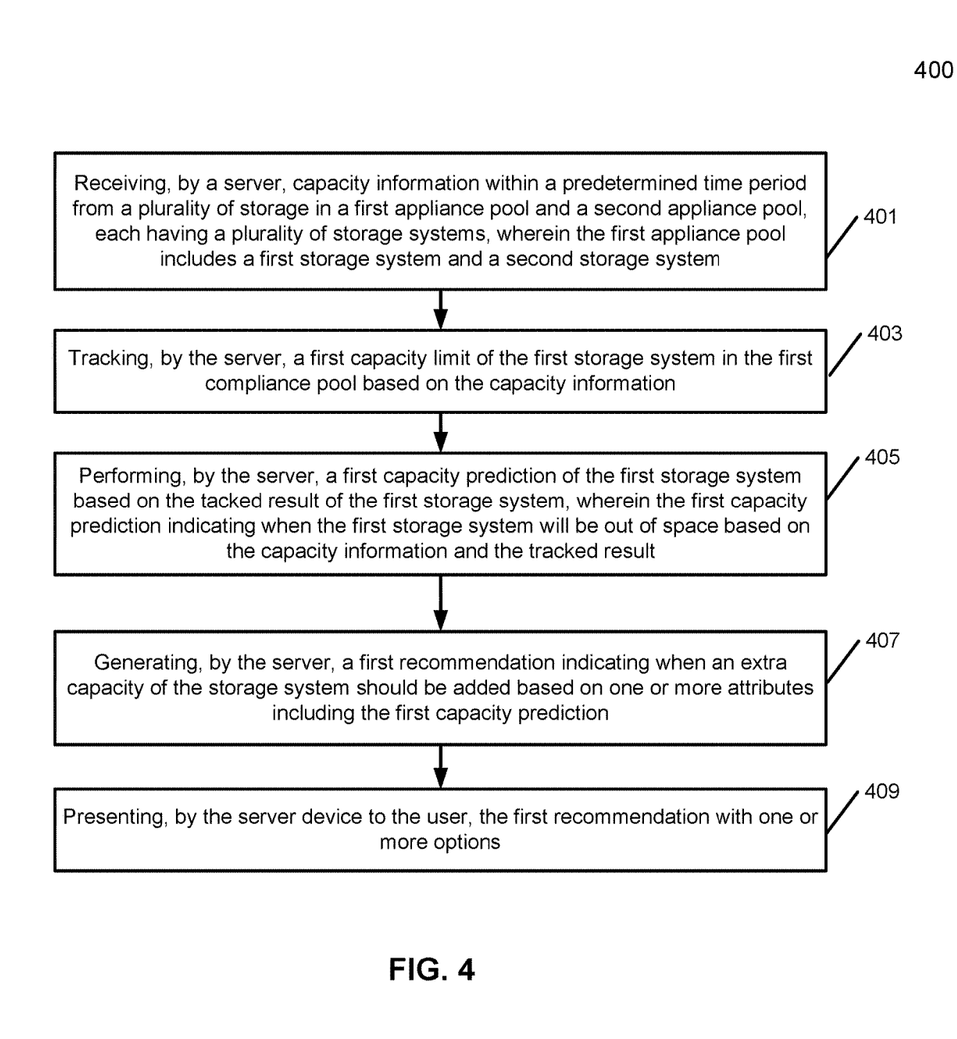
FIG. 4 is a flowchart illustrating a storage management system for processing recommendation services, according to an embodiment of the application.

FIG. 4 is a flowchart illustrating a storage management system 400 for processing recommendation services, according to an embodiment of the application. In particular, FIG. 4 is a flowchart illustrating a storage management system 400 for processing recommendation services to recommend adding capacity before a storage system (e.g., 101a) is within a specified number of days of reaching a capacity threshold.

At operation 401, the storage management system 115 can receive capacity information within a predetermined time period from a plurality of storage (101a, 101b, 103a, 103b) in a first appliance pool (105) and a second appliance pool (107), according to an embodiment. For example, each appliance pool (e.g., 105) can have a plurality of storage systems (e.g., 101a, 101b). In an embodiment, the first appliance pool (105) includes a first storage system (101a) and a second storage system (101b). At operation 403, the storage management system 115 can track a first capacity limit of the first storage system (e.g., 101a) in the first appliance pool (e.g., 105) based on the capacity information. At operation 405, the storage management system 115 can perform a first capacity prediction of the first storage system (e.g., 101a) based on the tracked result of the first storage system, according to an embodiment. For example, the first capacity prediction can indicate when the first storage system (e.g., 101a) will be out of space based on the capacity information and the tracked result. At operation 405, the storage management system 115 can generate a first recommendation indicating when an extra capacity of the first storage system should be added based on one or more attributes including the first capacity prediction, according to an embodiment. At operation 409, the storage management system 115 can present the first recommendation with one or more options to the user, according to an embodiment.

Figure 5:
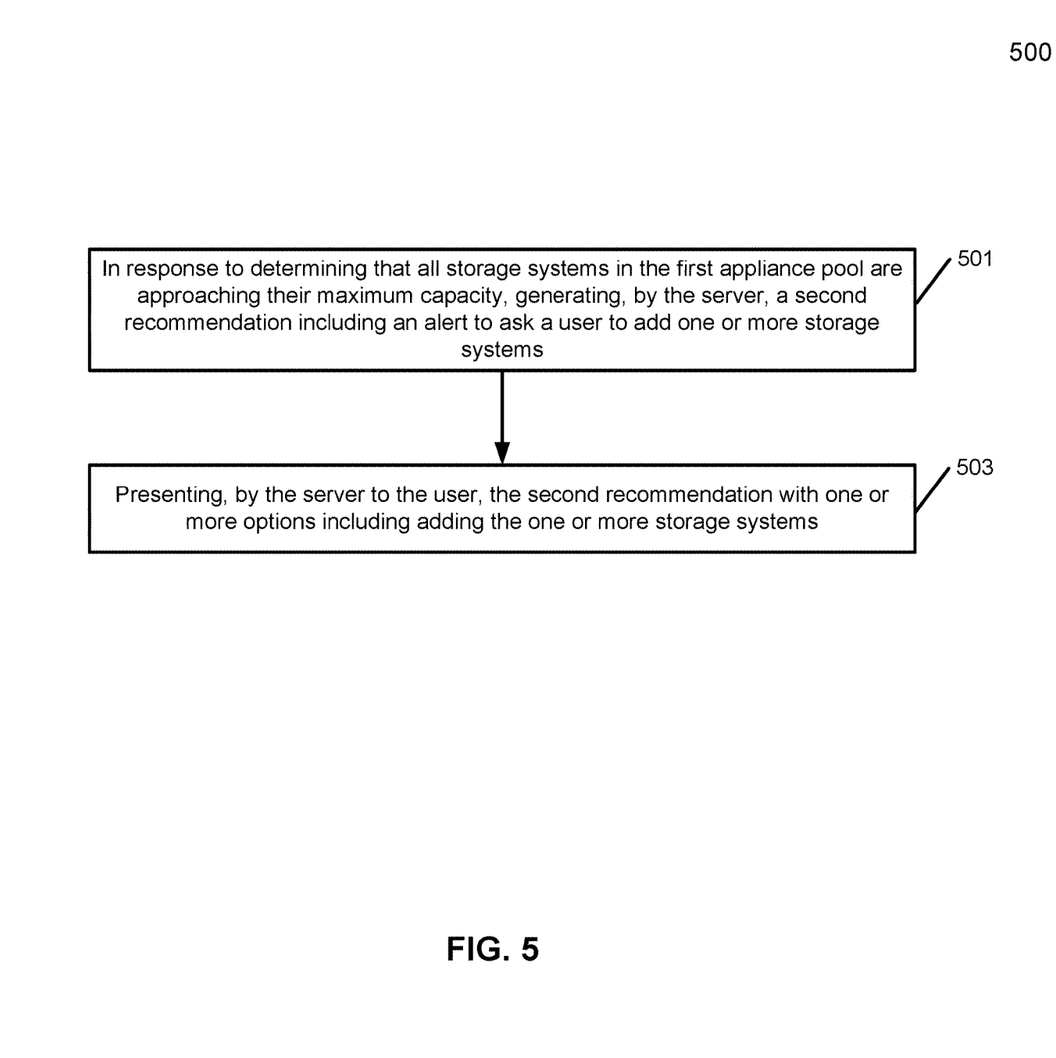
FIG. 5 is a flowchart illustrating a storage management system for processing recommendation services, according to an embodiment of the application.

FIG. 5 is a flowchart illustrating a storage management system 500 for processing recommendation services, according to an embodiment of the application. In particular, FIG. 5 is a flowchart illustrating a storage management system 500 for processing recommendation services to recommend adding a storage system to an appliance pool a specified number of days before the pool has reached a capacity threshold.

At operation 501, in response to determining that all storage systems (e.g., 101a, 101b) in the first appliance pool (e.g., 105) are approaching their maximum capacity, the storage management system 115 can generate a second recommendation including an alert to ask a user to add one or more storage systems, according to an embodiment. At operation 503, the storage management system 115 can present the second recommendation to the user with one or more options including adding the one or more storage systems, according to an embodiment.

Figure 6:
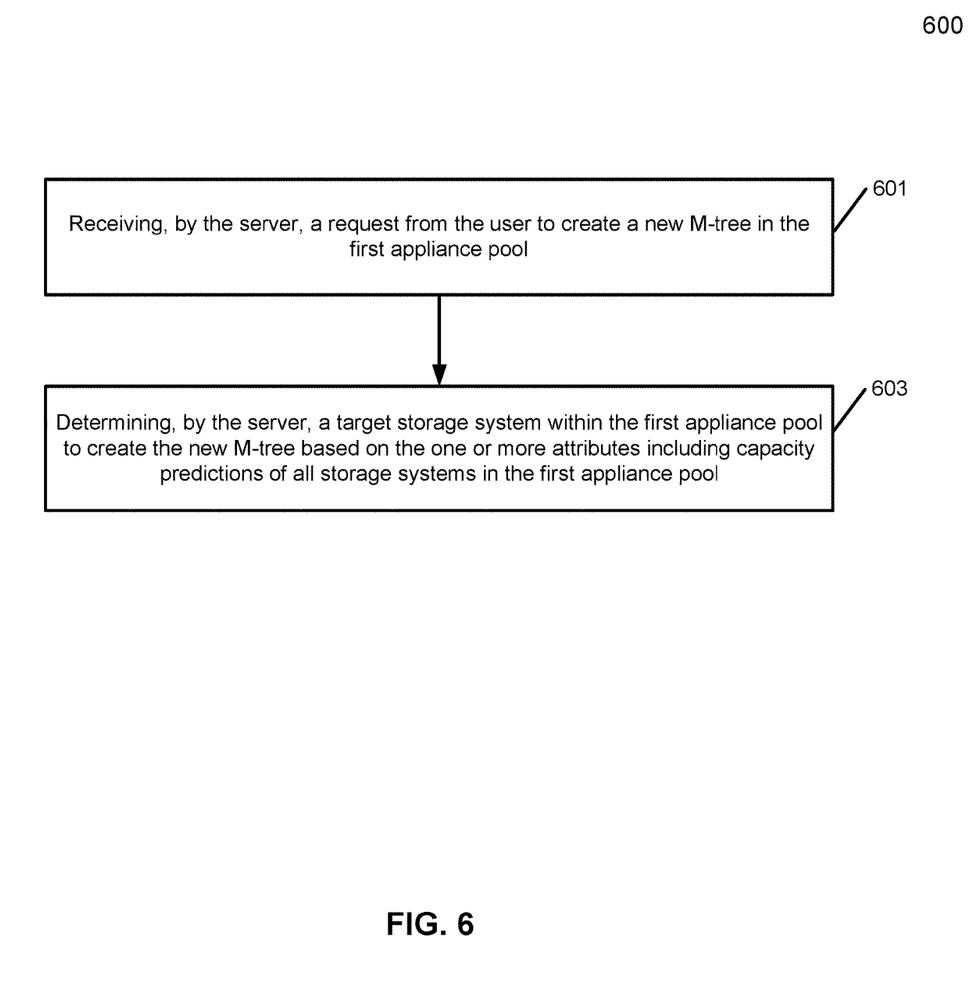
FIG. 6 is a flowchart illustrating a storage management system for processing recommendation services, according to an embodiment of the application.

FIG. 6 is a flowchart illustrating a storage management system 600 for processing recommendation services, according to an embodiment of the application. In particular, FIG. 6 is a flowchart illustrating a storage management system 600 for processing recommendation services to recommend where to place a M-tree/client/folder within an appliance pool (e.g., 105) to meet customer SLAs such that it will not need to be migrated for as long as possible.

At operation 601, the storage management system 115 can receive a request from the user to create a new M-tree in the first appliance pool (e.g., 105), according to an embodiment. At operation 403, the storage management system 115 can determine a target storage system within the first appliance (e.g., 105) to create the new M-tree based on the one or more attributes including capacity predictions of all storage systems in the first appliance pool (e.g., 105). In an embodiment, the one or more attributes including an estimated capacity needed, a backup schedule, one or more properties needed, or a combination thereof. In an embodiment, the one or more properties including replication, encryption, retention lock, or a combination thereof.

Figure 7:
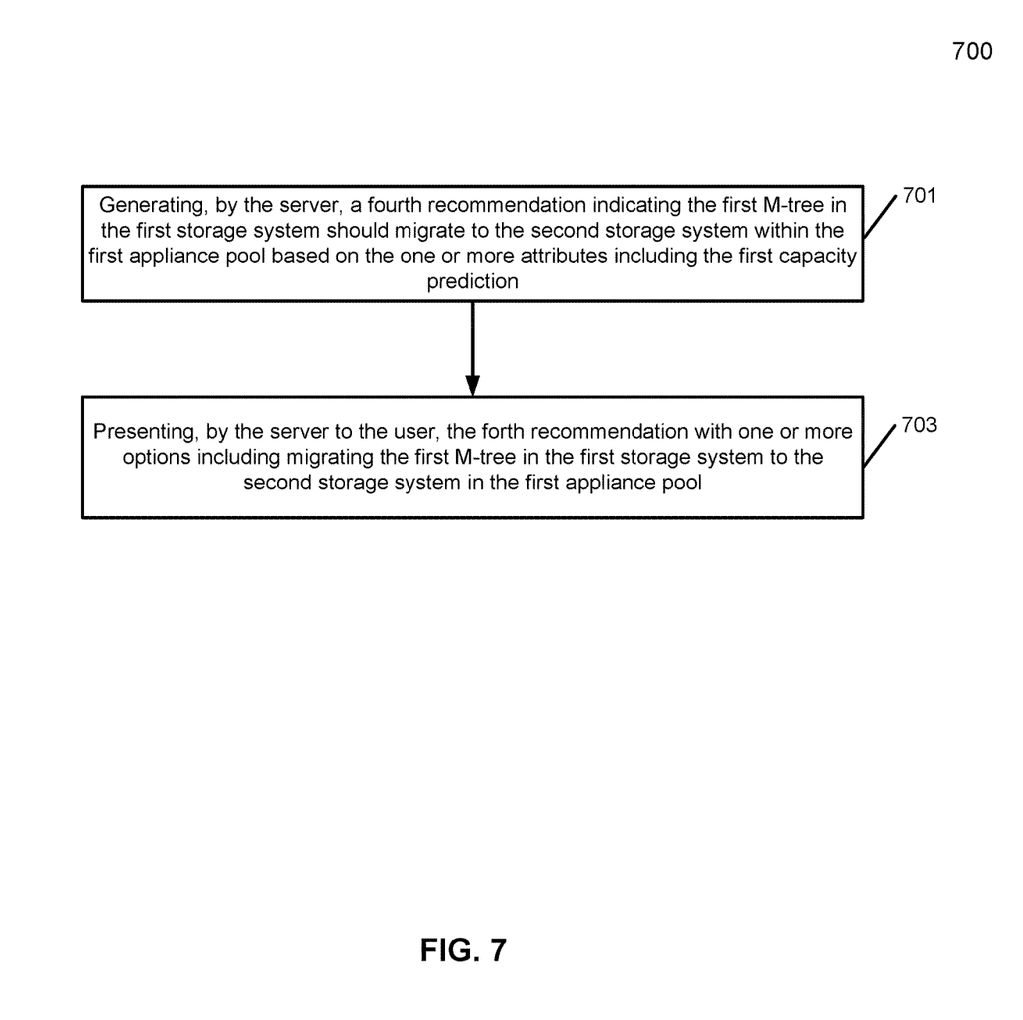
FIG. 7 is a flowchart illustrating a storage management system for processing recommendation services, according to an embodiment of the application.

FIG. 7 is a flowchart illustrating a storage management system 700 for processing recommendation services, according to an embodiment of the application. In particular, FIG. 7 is a flowchart illustrating a storage management system 700 for processing recommendation services to recommend where to migrate a M-tree/client/folder within an appliance pool (e.g., 105) to avoid overloading system capacity and to remove performance hot-spots for CPU, disk I/O, and streams, etc.

At operation 701, the storage management system 115 can generate a fourth recommendation indicating that the first M-tree in the first storage system (e.g., 101a) should migrate to the second storage system (e.g., 101b) within the first appliance pool (e.g., 105) based on the one or more attributes including the first capacity prediction, according to an embodiment. At operation 403, the storage management system 115 can present the fourth recommendation to the user with one or more options including migrating the first M-tree in the first storage system (e.g., 101a) to the second storage system (e.g., 101b) in the first appliance pool (e.g., 105). In an embodiment, the one or more attributes including the tracked result of the capacity limit of the first storage system (e.g., 101a), one or more properties, stream counts used by the first M-tree, a network bandwidth requirement, a timing of backups, a resource availability, content overlap between the first M-tree on the first storage system (e.g., 101a) and the second storage system (e.g., 101b).

Note that some or all of the components and operations as shown and described above (e.g., operations of methods 400-800 illustrated in FIG. 4-7) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
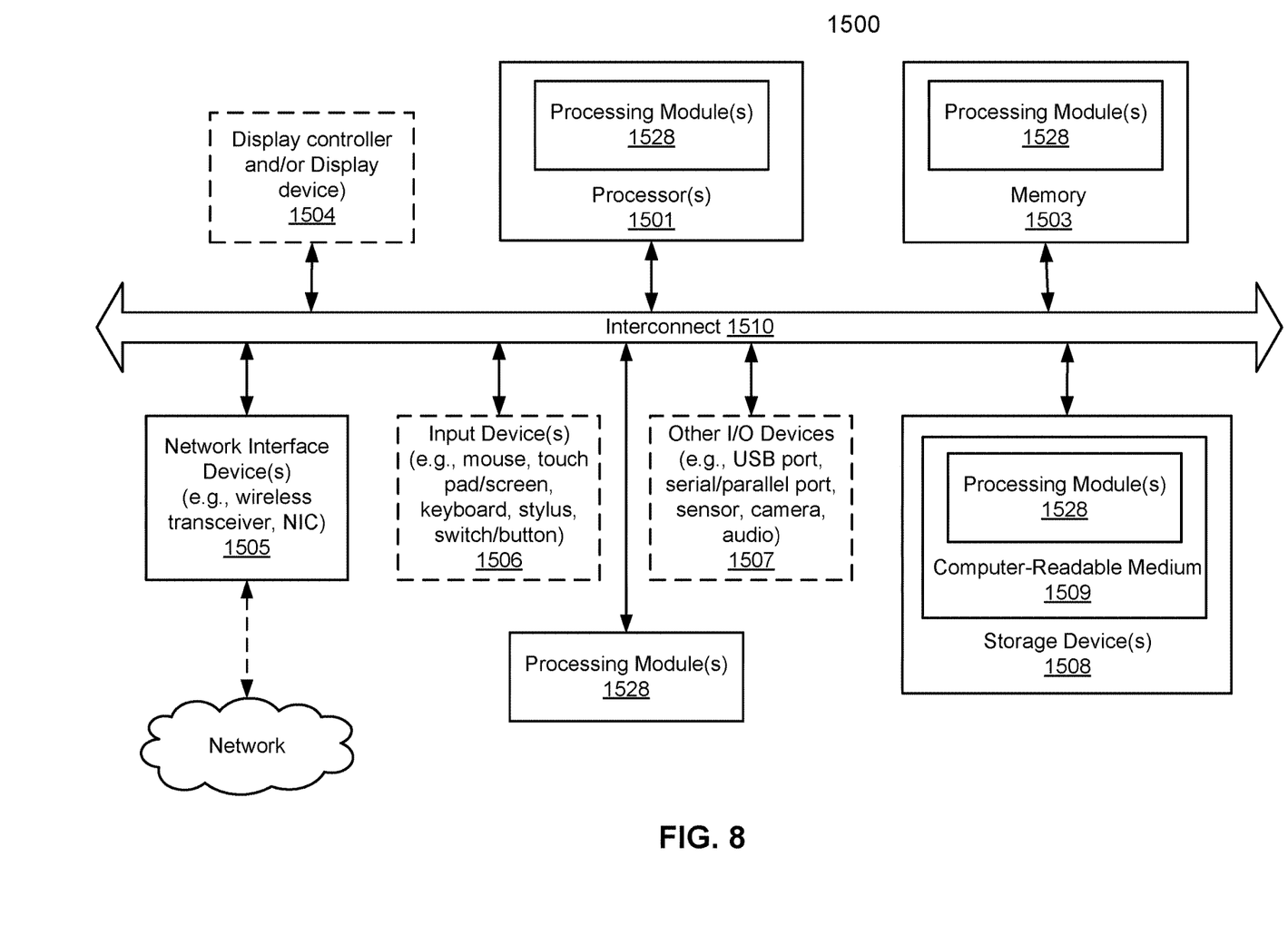
FIG. 8 is a block diagram illustrating a storage management system, according to an embodiment of the application.

FIG. 8 is a block diagram illustrating an example of a data processing system/storage system management center systems which may be used to provide Recommendation Service with one embodiment of the invention. For example, system 1500 may represent any of data processing/storage system management center systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high-level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, backup history module 123, snapshot generation module 203, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding Figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for storage management comprising:
    receiving, by a server, capacity information within a predetermined time period from a plurality of storage in a first appliance pool and a second appliance pool, each having a plurality of storage systems, wherein the first appliance pool includes a first storage system and a second storage system;
    tracking, by the server, a first capacity limit of the first storage system in the first appliance pool based on the capacity information;
    performing, by the server, a first capacity prediction of the first storage system based on a tracked result of the first capacity limit of the first storage system, wherein the first capacity prediction indicating when the first storage system will be out of space based on the capacity information and the tracked result of the first capacity limit of the first storage system;
    generating, by the server, a first recommendation indicating when an extra capacity of the first storage system should be added based on one or more attributes including the first capacity prediction;
    presenting, by the server to a user, the first recommendation with one or more options;
    receiving, by the server, a request from the user to create a new M-tree in the first appliance pool; and
    determining, by the server, a target storage system within the first appliance pool to create the new M-tree based on the one or more attributes including a backup schedule and one or more properties needed including retention lock.

2. The method of claim 1, further comprising:
    in response to determining that all storage systems in the first appliance pool are approaching their maximum capacity, generating, by the server, a second recommendation including an alert to ask a user to add one or more storage systems; and
    presenting, by the server to the user, the second recommendation with one or more options including adding the one or more storage systems.

3. The method of claim 1,
    wherein the one or more attributes include capacity predictions of all storage systems in the first appliance pool.

4. The method of claim 3, wherein the one or more attributes include an estimated capacity needed.

5. The method of claim 4, wherein the one or more properties include replication, encryption, or a combination thereof.

6. The method of claim 1, further comprising;
    generating, by the server, a fourth recommendation indicating a first M-tree in the first storage system should migrate to the second storage system within the first appliance pool based on the one or more attributes including the first capacity prediction; and
    displaying, by the server to the user, the fourth recommendation with one or more options including migrating the first M-tree in the first storage system to the second storage system in the first appliance pool.

7. The method of claim 6, wherein the one or more attributes include the tracked result of the first capacity limit of the first storage system, one or more properties, stream counts used by the first M-tree, a network bandwidth requirement, a timing of backups, a resource availability, content overlap between the first M-tree on the first storage system and the second storage system.

8. A non-transitory machine-readable medium having instructions stored therein, which when executed by a processor, cause the processor to perform operations, the operations comprising:
   receiving, by a server, capacity information within a predetermined time period from a plurality of storage in a first appliance pool and a second appliance pool, each having a plurality of storage systems, wherein the first appliance pool includes a first storage system and a second storage system;
   tracking, by the server, a first capacity limit of the first storage system in the first appliance pool based on the capacity information;
   performing, by the server, a first capacity prediction of the first storage system based on a tracked result of the first capacity limit of the first storage system, wherein the first capacity prediction indicating when the first storage system will be out of space based on the capacity information and the tracked result of the first capacity limit of the first storage system;
   generating, by the server, a first recommendation indicating when an extra capacity of the first storage system should be added based on one or more attributes including the first capacity prediction;
   presenting, by the server to a user, the first recommendation with one or more options;
   receiving, by the server, a request from the user to create a new M-tree in the first appliance pool; and
   determining, by the server, a target storage system within the first appliance pool to create the new M-tree based on the one or more attributes including a backup schedule and one or more properties needed including retention lock.

9. The non-transitory machine-readable medium of claim 8, wherein the operations further comprise:
   in response to determining that all storage systems in the first appliance pool are approaching their maximum capacity, generating, by the server, a second recommendation including an alert to ask a user to add one or more storage systems; and
   presenting, by the server to the user, the second recommendation with one or more options including adding the one or more storage systems.

10. The non-transitory machine-readable medium of claim 8,
    wherein the one or more attributes include capacity predictions of all storage systems in the first appliance pool.

11. The non-transitory machine-readable medium of claim 10, wherein the one or more attributes include an estimated capacity needed.

12. The non-transitory machine-readable medium of claim 11, wherein the one or more properties include replication, encryption, or a combination thereof.

13. The non-transitory machine-readable medium of claim 8, wherein the operations further comprise;
    generating, by the server, a fourth recommendation indicating a first M-tree in the first storage system should migrate to the second storage system within the first appliance pool based on the one or more attributes including the first capacity prediction; and
    displaying, by the server to the user, the fourth recommendation with one or more options including migrating the first M-tree in the first storage system to the second storage system in the first appliance pool.

14. The non-transitory machine-readable medium of claim 13, wherein the one or more attributes include the tracked result of the first capacity limit of the first storage system, one or more properties, stream counts used by the first M-tree, a network bandwidth requirement, a timing of backups, a resource availability, content overlap between the first M-tree on the first storage system and the second storage system.

15. A system, comprising:
    a processor; and
    a memory coupled to the processor to store instructions, which when executed by the processor, cause the processor to perform operations, the operations comprising:
    receiving, by a server, capacity information within a predetermined time period from a plurality of storage in a first appliance pool and a second appliance pool, each having a plurality of storage systems, wherein the first appliance pool includes a first storage system and a second storage system;
    tracking, by the server, a first capacity limit of the first storage system in the first appliance pool based on the capacity information;
    performing, by the server, a first capacity prediction of the first storage system based on a tracked result of the first capacity limit of the first storage system, wherein the first capacity prediction indicating when the first storage system will be out of space based on the capacity information and the tracked result of the first capacity limit of the first storage system;
    generating, by the server, a first recommendation indicating when an extra capacity of the first storage system should be added based on one or more attributes including the first capacity prediction;
    presenting, by the server to a user, the first recommendation with one or more options;
    receiving, by the server, a request from the user to create a new M-tree in the first appliance pool; and
    determining, by the server, a target storage system within the first appliance pool to create the new M-tree based on the one or more attributes including a backup schedule and one or more properties needed including retention lock.

16. The system of claim 15, wherein the operations further comprise:
    in response to determining that all storage systems in the first appliance pool are approaching their maximum capacity, generating, by the server, a second recommendation including an alert to ask a user to add one or more storage systems; and
    presenting, by the server to the user, the second recommendation with one or more options including adding the one or more storage systems.

17. The system of claim 15,
    wherein the one or more attributes include capacity predictions of all storage systems in the first appliance pool.

18. The system of claim 17, wherein the one or more attributes include an estimated capacity needed.

19. The system of claim 18, wherein the one or more properties include replication, encryption, or a combination thereof.

20. The system of claim 19, wherein the operations further comprise;
  generating, by the server, a fourth recommendation indicating a first M-tree in the first storage system should migrate to the second storage system within the first appliance pool based on the one or more attributes including the first capacity prediction; and
  displaying, by the server to the user, the fourth recommendation with one or more options including migrating the first M-tree in the first storage system to the second storage system in the first appliance pool.

* * * * *